United States Patent [19]

Huddle

[11] 4,060,718
[45] Nov. 29, 1977

[54] GEODETIC SURVEY METHOD

[75] Inventor: James R. Huddle, Chatsworth, Calif.

[73] Assignee: Litton Systems, Inc., Woodland Hills, Calif.

[21] Appl. No.: 749,356

[22] Filed: Dec. 10, 1976

[51] Int. Cl.² .......................... G01V 7/06; G06F 15/50
[52] U.S. Cl. ........................................ 364/421; 324/1; 340/15.5 R; 340/24; 364/460; 364/453
[58] Field of Search ...................... 235/150.27, 150.26, 235/150.25, 150.2, 151.3, 181; 340/15.5 R, 15.5 DS, 15.5 DP, 15.5 SS, 15.5 VD, 15.5 TN, 24; 33/1 R, 1 H, 318, 320, 321, 322, 331; 250/253; 73/382; 346/33 C; 324/1

[56] References Cited

U.S. PATENT DOCUMENTS

| | | | |
|---|---|---|---|
| 3,370,268 | 2/1968 | Dobrin et al. | 346/33 C X |
| 3,576,985 | 5/1971 | Lawrence | 235/181 |
| 3,702,477 | 11/1972 | Brown | 235/150.25 X |
| 3,864,667 | 2/1975 | Bahjat | 340/15.5 SS X |
| 3,930,145 | 12/1975 | Fort et al. | 235/151.3 |

OTHER PUBLICATIONS

Rose et al., "Direct Recovery of Deflections of the Vertical Using an Inertial Navigator", IEEE Transaction on Geoscience Electronics, Apr. 1972, pp. 85–92.

Primary Examiner—Joseph F. Ruggiero
Attorney, Agent, or Firm—Harold E. Gillmann

[57] ABSTRACT

The present method involves the detection of variations of the direction of gravity from the mathematical model of the earth, which may be caused by the presence of a discontinuity in the earth's surface, with relatively heavy materials in the earth's crust causing a deflection of gravity toward such heavier material. In accordance with the present method an inertial system is mounted in a mobile vehicle and the vehicle is moved along a survey route from a first control point to a second control point, with the locations and the deflection from the vertical being known at the two control points. The vehicle is stopped periodically between the two control points in order to eliminate accumulate errors in the inertial system, and to record the position of intermediate points to the surveyed. At each of the stopping points the indicated position of the stopping points relative to latitude, longitude, and elevation are recorded, and additional inertial system parameters are recorded as required to determine the deflection of the vertical at each of the survey points. To avoid complex intermingling of errors associated with the inertial system with the change in the deflection of the vertical, the inertial platform is not releveled at each of the stopping points. When the vehicle reaches the second control point, the position indicated by the inertial guidance system is compared with the actual position of the second control point as to latitude, longitude, and elevation, and following the determination of errors, the position of the various intermediate stopping points are recalculated taking the overall error and the time at which each point was surveyed into consideration. Similarly, the error in the deflection of the vertical, which is separate from the error in position, is determined, and the deflection from the vertical of each of the intermediate survey points is then determined. The results of the survey may then be plotted on a map.

7 Claims, 6 Drawing Figures

GEODETIC SURVEY METHOD

FIELD OF THE INVENTION

The present invention relates to a geodetic survey method using an inertial guidance system.

BACKGROUND OF THE INVENTION

It has previously been proposed to use inertial guidance system for conducting surveys. One such system is described in an article entitled "The Application of Inertial Navigation Systems to Precision Land Survey", by S. R. Ellms and J. R. Huddle, pages 93 through 105, Navigation, The Journal of the Institute of Navigation, Summer, 1976, Volume 23, No. 2. In such prior systems, the emphasis was on position location rather than measurement of "deflection of the vertical". As mentioned above, the deflection of the vertical is a phrase used to designate the departure of the gravity vector from the gravity vector which would be expected from a mathematical model of the earth. When a point on the earth's surface is located between two portions of the earth's crust having significantly different densities, the gravity vector will be shifted slightly toward the more dense material, and this deflection of the gravity vector from the direction which would normally be expected is known as "deflection of the vertical". The deflection of the vertical is normally not very significant and rarely reaches a value above 50 or 100 arc-seconds, where there are 3600 arc-seconds in one degree. However, deflections of the vertical are of considerable interest to geologists and others who are interested in the location of bodies of ore, or other geological formations which are indicated by gravitational anomalies.

Returning to a consideration of prior navigation land survey methods, the method described in the article cited above included the mounting of an inertial system including a stable platform on a vehicle such as a jeep, aligning the inertial navigation system, and driving it from a first control point to a second control point. Between the two control points, the vehicle would be stopped at intermediate points to be surveyed, and at time intervals not in excess of predetermined limits, in order to eliminate accumulated errors. In addition, at each stop the inertial navigation system would determine the direction of the local vertical, and the stable element of the inertial system is releveled. At the end of the survey another control point would be reached, and the position errors for the intermediate points would be recalculated using the overall error in position, together with the time of surveying of the various individual intermediate points.

One of the serious short-comings of the prior system involved the releveling of the inertial guidance system at each stopping point. This produced a complex intermingling of errors associated with the inertial system with changes in the deflection of the vertical.

Accordingly, a principal object of the present invention is to avoid complex intermingling of inertial system errors with the change in the deflection of the vertical, in inertial guidance survey methods.

BRIEF SUMMARY OF THE INVENTION

In accordance with the invention an inertial guidance system is mounted on a mobile vehicle, and is initially turned on and aligned with the local geographic coordinates; and it is thereafter driven from a first control point reading to a second control point reading with periodic stops between the two control point readings. For the second control point reading, the deflection of the vertical indicated by the inertial system is observed and compared with the known deflection of the vertical, and the magnitude and direction of the error is determined for the period of the survey. At each stopping point, the time, the position and other inertial system sensing unit output signals as required for determining deflection of the vertical, are recorded, without releveling the inertial system at the intermediate stops. Following completion of the survey, the deflection of the vertical for the intermediate survey points is calculated, using the control point deflection of the vertical error determination, the information recorded at each survey point, and the times at which the various stops occurred.

In accordance with a feature of the invention, the continuation from one stopping point to another without releveling of the apparatus prevents complex intermingling of (1) inertial system error and (2) change in the deflection of the vertical and thus facilitate determination of the deflection of the vertical at each stopping point with high accuracy.

Other objects, features, and advantages of the invention will become apparent from a consideration of the following detailed description, and from the accompanying drawings.

DETAILED DESCRIPTION

Figure 1:
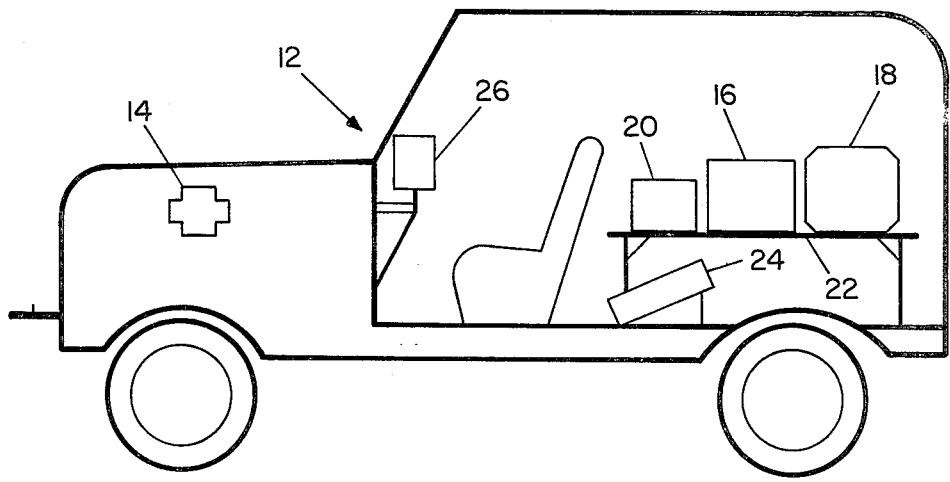
FIG. 1 shows diagrammatically a geodetic survey system using an inertial platform mounted in a vehicle.

With reference to the drawings, FIG. 1 shows a vehicle 12 in which the various units making up the inertial geodetic surveying system are mounted. More specifically, the vehicle 12 carries the power source 14 in the engine compartment, three units including the power supply 16, the inertial guidance unit 18, which includes a stable platform, the gyroscopes, and the accelerometers, and the computer or data processing unit 20 all mounted on a table or rack 22. The input-output controller unit 24 is mounted at an angle on the floor of the vehicle. The control and display unit 26 is mounted above the dashboard of the vehicle 12 so that it is readily accessible for actuation of switches and the like by the driver or the passenger in the front seat of vehicle 12.

Figure 2:
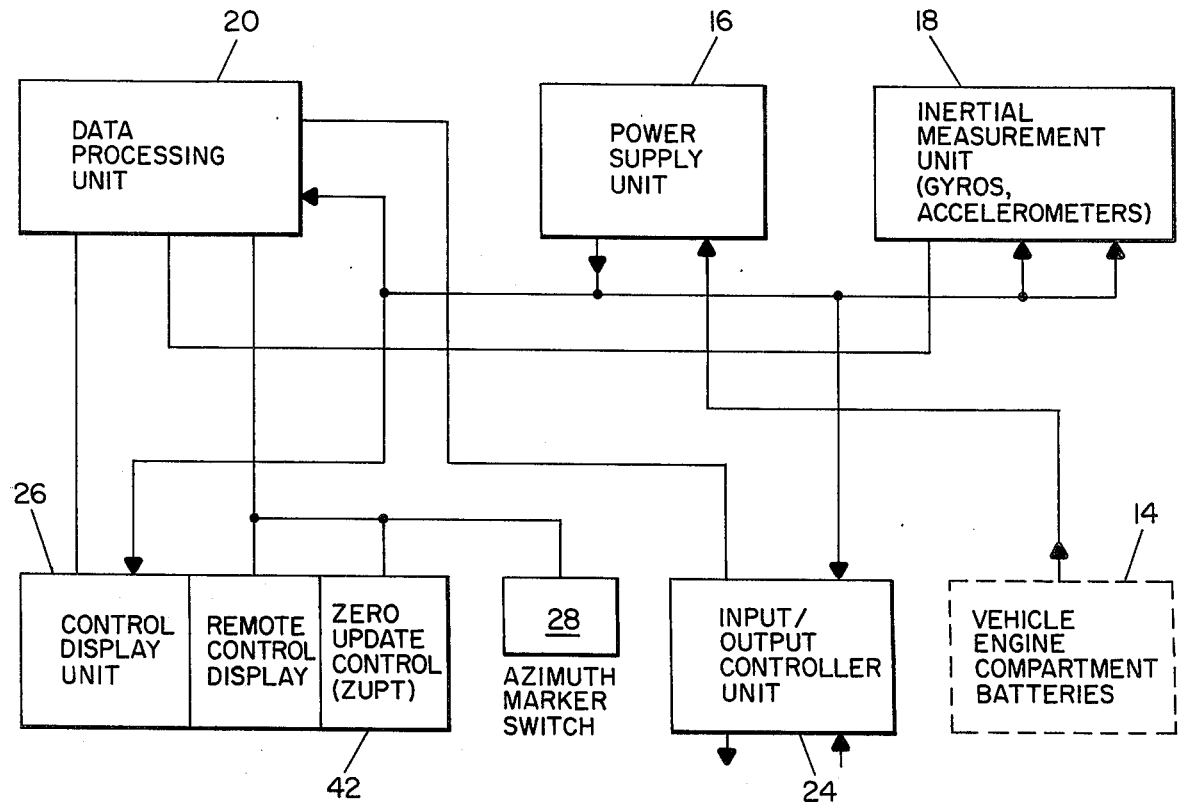
FIG. 2 is a block diagram of the system of FIG. 1.

FIG. 2 shows a block diagram of the interconnections of the various units shown in vehicle 12 in FIG. 1. In addition, FIG. 2 shows the azimuth marker switch 28 which is employed in the control of the system.

The system as shown in FIGS. 1 and 2 is known as the "AUTO SURVEYOR" system and is available from a company having the following address: Span International, Inc., 733 E. Shoeman Lane, Scottsdale, Arizona 85251; alternate address: P. O. Box 29534, San Antonio, Texas, 78229.

Figure 3:
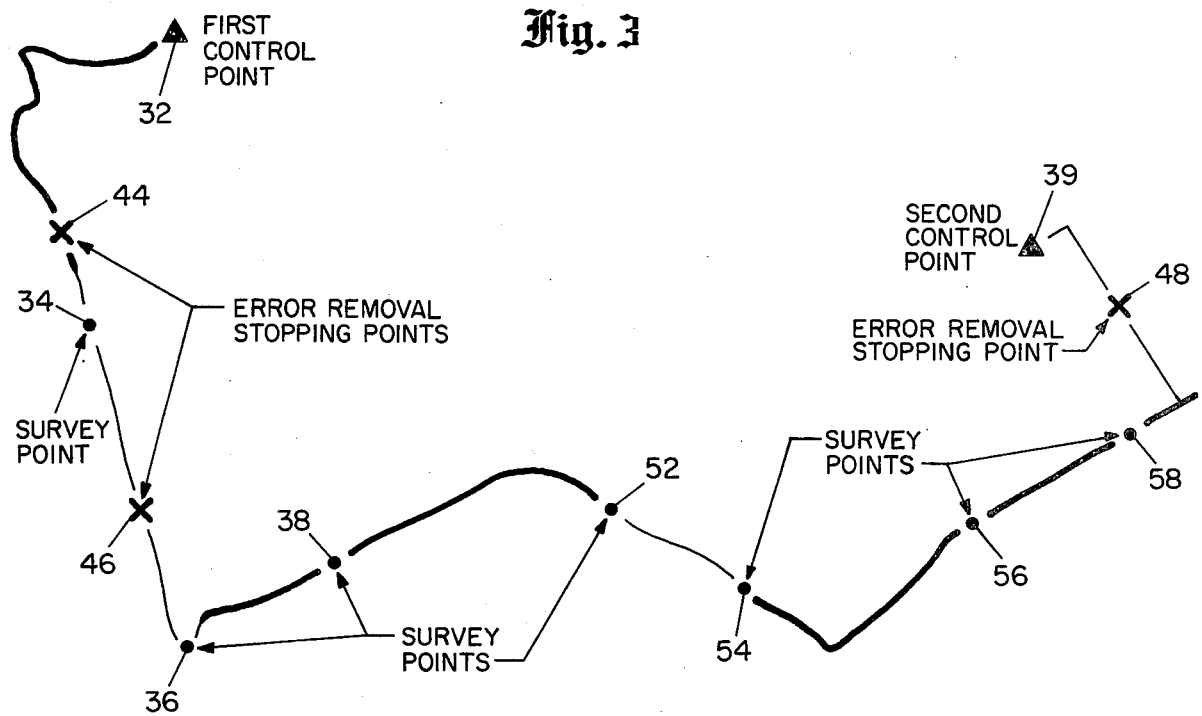
FIG. 3 is a typical surveying route for the surveying system shown in FIGS. 1 and 2.

FIG. 3 shows a typical survey route which might be traversed from first control point 32 to a second control point 34 via a number of survey points indicated by circular dots, and a number of additional error removal stopping points indicated by "x's".

In operation, as is described in instruction manuals provided with the purchase of the "AUTO SURVEYOR" system, the system is initially turned on and is aligned with the north-south and east-west axes at the point where the vehicle is located. This is accomplished in part by the inertial navigation system including the stable element, the gyroscopes, and three mutually orthogonal accelerometers contained in the inertial measurement unit 18. For example, to accomplish leveling or rebalancing of the system to the local vertical, the acceleration of gravity is sensed and the system is oriented so that the east-west and north-south accelerometers indicate zero acceleration. To align the system with the true north-south and east-west at the location where the vehicle is located, the rotation of the earth is sensed by the inertial measurement unit (IMU).

Following alignment to the local north-south and east-west coordinates, if this does not take place at the first control point 32, shown in FIG. 3, the vehicle is moved to such a point 32 where the latitude, longitude, elevation and deflection of the vertical are known precisely. The AUTO SURVEYOR unit is provided with entry arrangements so that the precise value of the latitude and longitude, as well as the elevation may be entered into the geodetic surveying system. In addition, readings of the outputs of the accelerometers may be taken at the first control point from which the orientation of the platform relative to the local vertical may be determined; or alternatively, the stable element in the inertial platform unit may be releveled to the local vertical or to the geodetic vertical. In addition to the other entries which are recorded at the first control point 32 of FIG. 3, the time for recording is also noted. As will be mentioned later, the errors due to drift and the like of the inertial system accumulate with time, and it is only through the recording of the time of the recording of data at each of the survey and control points that the accumulated errors may be properly removed through a recalculation process.

From the first control point 32, the vehicle 12 proceeds along the route indicated in FIG. 3 toward the survey points 34, 36, 38, etc. In an inertial navigation system, however, the accelerations in three mutually orthogonal directions, east-west, north-south, and vertically, are sensed; these accelerations are integrated to give velocities, and the velocities are integrated to provide distance calculations. Clearly, if there is an error which creeps into the system, the multiple integration will result in significantly increasing the error as long as it is not removed from the system. Accordingly, on a periodic basis and at time intervals from 3 up to perhaps 15 minutes, depending on the accuracy of the survey, the vehicle 12 together with its equipment, of course, is stopped. A switch on the zero update control 42 shown as part of the control unit in FIG. 2, is actuated. This gives a zero velocity measurement reference, and by use of these periodic zero velocity references the system is allowed to correct velocity and position error as well as other system error sources. The entire update procedure is accomplished automatically in approximately 20 seconds of time.

In FIG. 3 the maximum time allowed between "zero updates" had elapsed by the time the vehicle reached the first point "X" which is also designated as point 44. Following the update procedure, the vehicle continues to the survey point 34 where an additional zero update sequence is performed. In addition, of course, the indicated position of the survey point 34 in accordance with the IMU measurements, is recorded along with the time, and other output information as needed to determine the deflection of the vertical at the survey point.

As mentioned above, in accordance with the present invention, no releveling of the stable element of the IMU occurs at the stopping points.

As the vehicle proceeds from control point 32 to control point 39, additional stops take place at the error removal stopping points 46 and 48 as well as at the additional survey points 52, 54, 56 and 58 on route to the final control point 39. At the control point 39 the exact position readings of the system are recorded, as well as the other IMU output readings necessary to determine the IMU system's indicated deflection of the vertical.

By comparing the indicated position and deflection of the vertical at the second control point with the actual known values of position and deflection of the vertical at this control point, the errors which have been building up overtime, despite the periodic stops which eliminate certain errors, can be determined. Thereafter, in a post mission smoothing technique, the position of the various survey points as well as the deflection of the vertical at each of these survey points may be redetermined with greatly increased accuracy.

Figure 4:
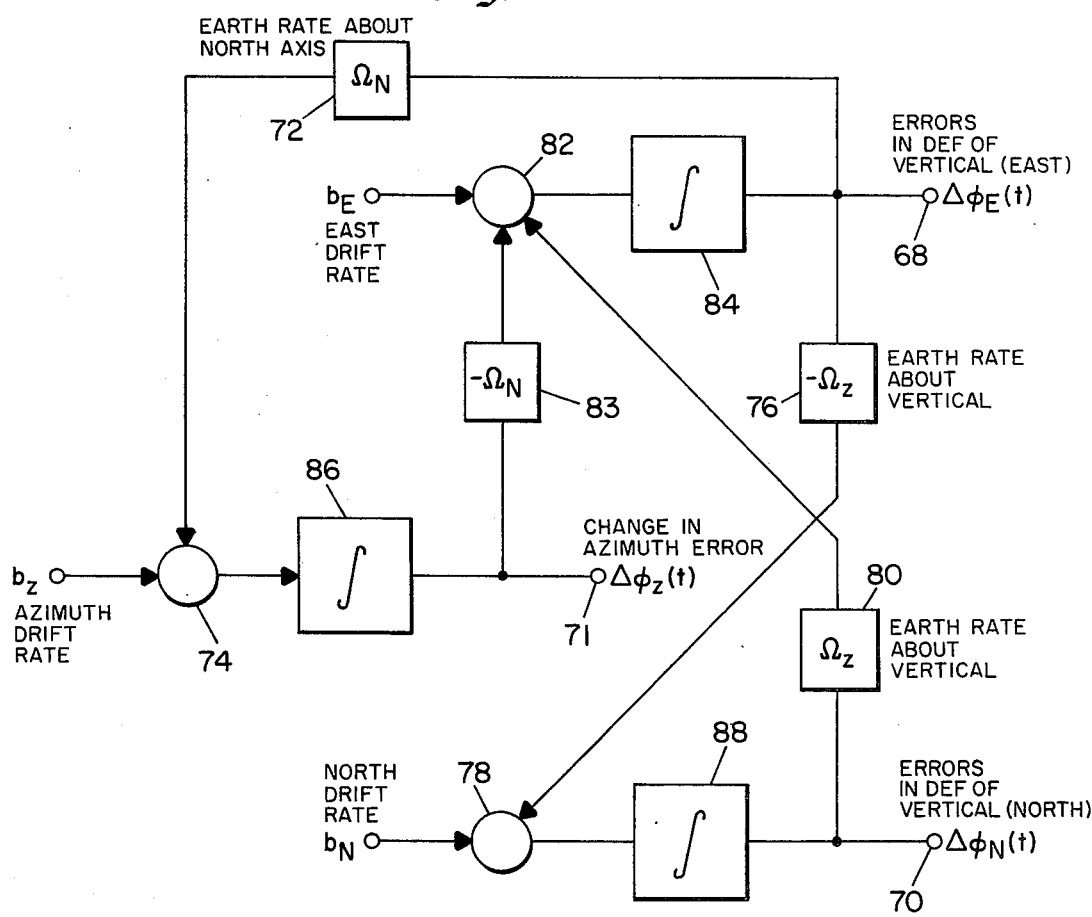
FIG. 4 is a simplified representation of an error model indicating the principles upon which the present invention is based.

FIG. 4 is a simplified representation in block diagram form of the dynamic error model upon which the post mission smoothing of the error in the real time estimate of the change in the deflection of the vertical is based. In FIG. 4 the three inputs at points 82, 74, and 78 are the drift rates $b_E$, $b_Z$, and $b_N$, relating to the east drift rate, the azimuth drift rate and the north drift rate, respectively. At the right-hand side of FIG. 4 the errors in the deflection of the vertical measurements in the east and the north directions appear at output points 68 and 70, respectively, and the change in azimuth error appears at output point 71. Other blocks which appear in FIG. 4 include the coupling factors or coupling coefficients "omega", where "omega" ($\Omega$) represents the earth rate. More specifically, the two coupling coefficients omega represent the earth rate about the vertical and in the north-south direction, in each case with "z" identifying the factors relating to the vertical, and the factor "N" representing the north-south factor. Incidentally, earth rate comes in as a factor in view of the known phenomenon in inertial systems for the system to remain in a fixed orientation relative to inertial space (to the fixed stars in the universe) and the corresponding need to compensate for the rotation of the earth on its axis. Returning to FIG. 4, the block 72 connected between output 68 and summing point 74 represents the north earth rate factor omega-north; the block 76 connected between outputs 68 and summing point 78 represents the negative of omega-z or the azimuth earth rate factor; and block 80 connected between output 70 and summing point 82 involves the omega-z factor or the azimuthal earth rate. Block 83 between output point 71 and summing point 82 represents the negative of the north earth rate factor. The integrator blocks 84, 86 and 88 which appear in the block diagram of FIG. 4 essentially represent the build-up of the errors over time.

Figure 6:
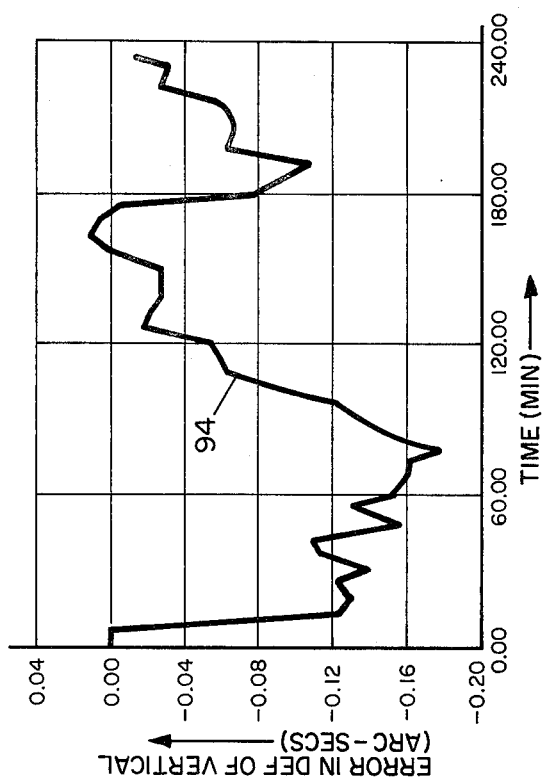
FIGS. 5 and 6 are comparative plots showing the error in the deflection of the vertical plotted against time for a prior art system and for the system of the present invention.
Figure 5:
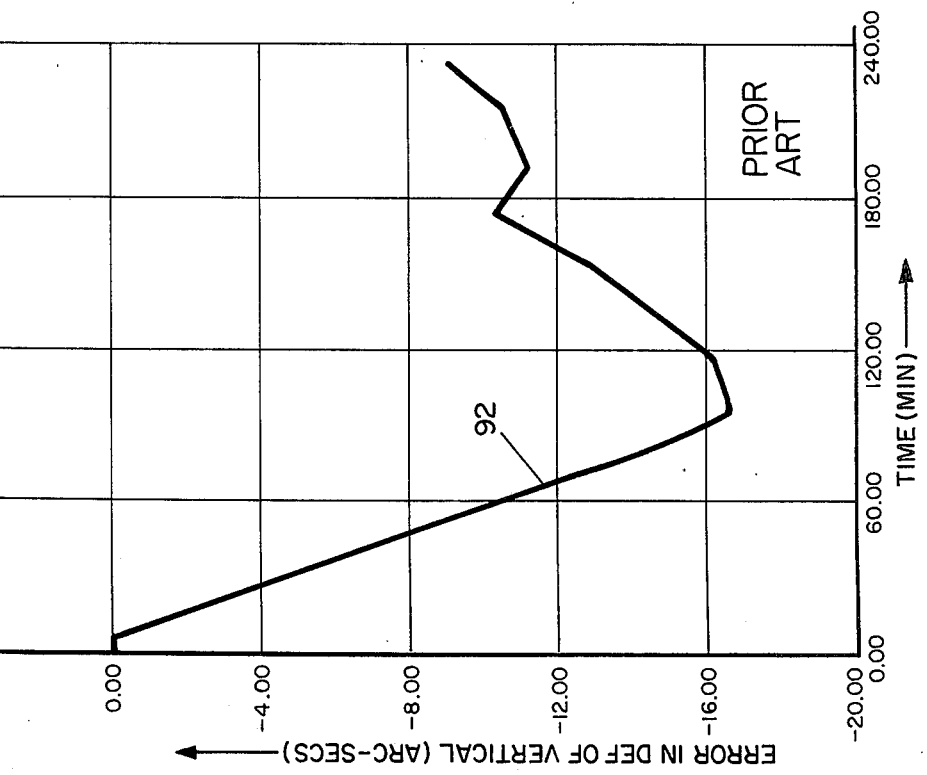

FIGS. 5 and 6 represent the error in the deflection of the vertical, in arc-seconds plotted against time for a prior art system (FIG. 5) and for the system in accordance with the present invention. In FIG. 5 note that the characteristic 92 has a value of −16.0 or more arc-seconds at its farthest departure from zero error. In contrast, note that the maximum error indicated in the system in accordance with the present invention shown by characteristic 94 in FIG. 6, is less than 0.20 or 1/5 of an arc-second. Incidentally, in passing, it is noted that the indicated error in FIG. 5 is actually the approximate change in the deflection of the vertical over the test course used for both FIG. 5 and FIG. 6. This result arises, of course, from the fact that in accordance with the prior art system the stable element of the platform was releveled at each stop. In summary, now that the system and its mode of operation and advantages have been briefly described, a table of the method steps included in the operation of the system will be set forth:

TABLE No. 1

1. Turn on.
2. Inertial System North-South & East-West Orientation.
3. Inertial Guidance System Biasing.
4. Initial Control Point Positioning Readings.
5. Orientation of Inertial System to Local Vertical.
6. Initial Control Point "Deflection of the Vehicle" Readings.
7. Vehicle Movement.
8. Periodic Stops to Eliminate Inertial Systems errors.
9. Vehicle Movement.
10. Stop at Points to be Surveyed.
11. Determine Indicated Position of Inertial System.
12. Record Inertial System Parameters for Determining Deflection of Vertical, Without Reorienting Platform to Local Vertical.
13. Vehicle Movement.
14. Repeat Stops 7–13 for Survey Route.
15. Second Control Point Positioning Readings.
16. Second Control Point Deflection of the Vertical Readings.
17. Determine Position Errors Between First and Second Control Point Readings.
18. Correct Intermediate Survey Point Position Readings.
19. Determine Errors in Deflection of the Vertical Between First and Second Control Point Readings.
20. Calculate Deflection of the Vertical at Intermediate Survey Points.

Now that the drawings and the method of operation of the system have been described, it is useful to provide additional technical background and an outline of the mathematical approach employed to implement the post-mission smoothing of the deflection of the vertical data which was taken at each of "$n$" stopping points, for both north-south and east-west deflection at successive times $t_1, t_2, t_3 \ldots t_n$.

Before going on with the mathematical analysis, a series of articles will be cited to present related background information both with regard to the mathematical approach and concerning previous proposals for using inertial guidance systems for determining the deflection of the vertical.

1. Kalman, R. E., "New Methods and Results in Linear Prediction and Filtering Theory", Rias Technical Report 61-1, Baltimore, 1961.
2. Huddle, J. R., "Application of Kalman Filtering Theory to Augmented Inertial Navigation Systems", Chapter 11, NATO-AGARDograph 139, Editor C. T. Leondes, February 1970.
3. Rose, R. C. and Nash, R. A., "Direct Recovery of Deflections of the Vertical Using an Inertial Navigator", IEEE Transactions on Geoscience Electronics, GE-10 No. 2, April 1972.
4. Huddle, J. R. and Maughmer, R. W., "The Application of Error Control Techniques in the Design of an Advanced Augmented Inertial Surveying System", 28th Annual Meeting of the Institute of Navigation, West Point, June, 1972.
5. "The Position and Azimuth Determining System", Kitchens, C. W. Sr., American Congress on Surveying and Mapping in Orlando, Florida, October, 1973.
6. "The Prototype Jeep-Mounted Position and Azimuth Determining System (PADS)", Perrin, J. L., Proceedings of the 8th Data Exchange Conference for Inertial Systems at MIT, August, 1974, pp. 214–236.
7. "Gravimetric and Position Determinations Using Land-Based Inertial Systems", Huddle, J. R. and Mancini, A., Proceedings of the 35th Annual Meeting of the American Congress on Surveying and Mapping in Washington, D. C., March 1975, pp. 93–106.
8. "Testing an Airborne Inertial Survey System for Bureau of Land Management Cadastral Survey Applications in Alaska", Ball, W. E., Proceedings of the 35th Annual Meeting of the American Congress on Surveying and Mapping in Washington, D.C., March, 1975, pp. 107–137.
9. "Inertial Instrumentation at the Geodetic Survey of Canada", Gregerson, L. F., Commonwealth Survey Officers Conference at Cambridge, England, August 1975, and the General Assembly of the IUGGIAG in Grenoble, August and September, 1975.
10. "The Application of Inertial Navigation Systems to Precision Land Survey", Ellms, S. R. and Huddle, J. R., 31st Annual Meeting of the Institute of Navigation at Washington, D.C., June, 1975.
11. "Inertial Geodesy in Canada", Gregerson, L. F., American Geophysical Union Conference, San Francisco, California, December, 1975.
12. "A Second-Order Markov Gravity Anomaly Model", Kasper, J. F., Journal of Geophysical Research Vol. 76, No. 32, Nov. 10, 1971, pp. 7844–7849.
13. "Inertial Surveys in Private Practice", Barr, J. R., Alaska Surveying and Mapping Convention, January, 1976.

In passing, it may be noted that some of the foregoing articles are authored by the present inventor or his associates. Also, with regard to prior inertial guidance systems employed or proposed to determine the deflection of the vertical, none of them is capable of accuracies approaching that of the present system in which errors are held to less than two arc-seconds.

In the following analysis, an off-line, post-mission mathematical smoothing procedure or program is defined. The function of the analysis is to:

1. Employ the difference between:
   An arbitrary number of reference measurements of the change in the components of the deflection of the vertical, relative to the mission initiation point and:
   The real-time estimates of the deflection component changes as obtained in real-time by the surveying systems along the survey course relative to the mission initiation point to:
   Estimate the components of platform drift rate about the east, north and vertical axes during the mission.

2. Employ the estimates of the three platform drift rates so obtained, to improve the real-time estimates of the change in the components of the deflection of the vertical. Since:

The number of reference deflection change component measurements is arbitrary, and The platform drift rate components to be estimated are assumed constant, a recursive mechanization based upon Kalman filter theory has been selected for the implementation of the platform drift rate estimation function in the post-mission smoother. Once these 3 drift rate estimates $[b_E, b_N, b_z]$ are obtained, the estimates of the errors $[\delta\Delta\hat{\xi}(t), \delta\Delta\hat{\eta}(t)]_s$ induced in the real-time deflection change estimates $[\Delta\hat{\xi}(t), \Delta\hat{\eta}(t)]_R$ are obtained by a linear time-variant transformation, $H(t)$:

$$\begin{bmatrix} \delta\Delta\hat{\xi}(t) \\ \delta\Delta\hat{\eta}(t) \end{bmatrix}_s = [H(t)] \begin{bmatrix} \hat{b}_E \\ \hat{b}_N \\ \hat{b}_z \end{bmatrix} \quad (1)$$

and used to obtain the improved, real-time or smoothed estimates of the deflection changes $[\Delta\hat{\xi}(t), \Delta\hat{\eta}(t)]_s$ relative to the mission initiation point as follows:

$$\begin{bmatrix} \Delta\hat{\xi}(t) \\ \Delta\hat{\eta}(t) \end{bmatrix}_s = \begin{bmatrix} \Delta\hat{\xi}(t) \\ \Delta\hat{\eta}(t) \end{bmatrix}_R - \begin{bmatrix} \delta\Delta\hat{\xi}(t) \\ \delta\Delta\hat{\eta}(t) \end{bmatrix}_s \quad (2)$$

Definition of the Post-Mission Smoothing Program

Initially, the analytical model for the propagation of error in the real-time estimates of the deflection change components due to constant platform drift rate may be represented as follows:

$$\epsilon(t) = H(t) b \quad (3)$$

where:

$\epsilon(t) \triangleq \begin{bmatrix} \delta\Delta\xi(t) \\ \delta\Delta\eta(t) \end{bmatrix}$ are the induced errors in the estimates of the North-South ($\Delta\xi$) and the East-West ($\Delta\eta$) deflection changes.

$b = \begin{bmatrix} b_E \\ b_N \\ b_z \end{bmatrix}$ are the constant platform drift rates about the east, north and vertical axes $$H(t) \triangleq \begin{bmatrix} h_{11}(t) & h_{12}(t) & h_{13}(t) \\ h_{21}(t) & h_{22}(t) & h_{23}(t) \end{bmatrix} = \begin{bmatrix} <h_1(t) \\ <h_2(t) \end{bmatrix} \quad (4)$$

$$h_{11}(t) = -[\Omega^{-1} \cdot \sin[\Omega t]] \quad (5)$$

$$h_{12}(t) = -[\Omega^{-1} \cdot \sin[\Phi] \cdot [1 - \cos[\Omega t]]] \quad (6)$$

-continued $$h_{13}(t) = [\Omega^{-1} \cdot \cos[\Phi] \cdot [1 - \cos[\Omega t]]] \quad (7)$$

$$h_{21}(t) = h_{12}(t) \quad (8)$$

$$h_{22}(t) = [t \cdot \cos^2[\Phi] - \sin^2[\Phi] \cdot h_{11}(t)] \quad (9)$$

$$h_{23}(t) = [\sin[\Phi] \cdot \cos[\Phi] \cdot [t + h_{11}(t)]] \quad (10)$$

Organization of Data of Platform Drift Rate Estimation

After a mission has been performed, real-time estimates of the change in the components of the deflection of the vertical relative to the mission initiation point will be available at the end of each "marked" vehicle stopping point. These data will be assumed available as 2, n-dimensional vectors:

$$\Delta\hat{\xi}_R \triangleq \begin{bmatrix} \Delta\hat{\xi}(t_1) \\ \vdots \\ \Delta\hat{\xi}(t_n) \end{bmatrix}_R \quad \text{vector of North-South deflection change estimates at the times, } t_i; i = 1, \ldots, n, ; t_{i+1} > t_i. \quad (11)$$

$$\Delta\hat{\eta}_R \triangleq \begin{bmatrix} \Delta\hat{\eta}(t_1) \\ \vdots \\ \Delta\hat{\eta}(t_n) \end{bmatrix}_R \quad \text{vector of East-West deflection change estimates at the times, } t_i. \quad (12)$$

Depending on the (permitted) availability of reference measurements of the change in the deflection components, 2m-dimensional sub-vectors ($m < n$) of the differences between the real-time estimates of the deflection changes and the reference changes can be formed:

$$\delta\Delta\hat{\xi}_R = \begin{bmatrix} \delta\Delta\hat{\xi}(t_{i_1}) \\ \vdots \\ \delta\Delta\hat{\xi}(t_{i_m}) \end{bmatrix}_R \triangleq [\Delta\hat{\xi}_R - \Delta\xi] = \quad (13)$$

$$\begin{bmatrix} [\Delta\hat{\xi}(t_{i_1}) - \Delta\xi(t_{i_1})] \\ \vdots \\ [\Delta\hat{\xi}(t_{i_m}) - \Delta\xi(t_{i_m})] \end{bmatrix}$$

$$\delta\Delta\hat{\eta}_R = \begin{bmatrix} \delta\Delta\hat{\eta}(t_{i_1}) \\ \vdots \\ \delta\Delta\hat{\eta}(t_{i_m}) \end{bmatrix}_R \triangleq [\Delta\hat{\eta}_R - \Delta\eta] = \quad (14)$$

$$\begin{bmatrix} [\Delta\hat{\eta}(t_{i_1}) - \Delta\eta(t_{i_1})] \\ \vdots \\ [\Delta\hat{\eta}(t_{i_m}) - \Delta\eta(t_{i_m})] \end{bmatrix}$$

Assuming the validity of the mathematical model defined above, the differences can be related to the platform drift rate vector as:

$$\delta\Delta\hat{\xi}_R \simeq H_1 b \quad (15)$$

-continued $$\delta\Delta \hat{\eta}'_R \simeq H'_2 b \tag{16}$$

where:

$$H_1 \triangleq \begin{bmatrix} <h_1(t_{i_1}) \\ \vdots \\ <h_2(t_{i_m}) \end{bmatrix} \tag{17}$$

$$H'_2 \triangleq \begin{bmatrix} <h_2(t_{i_1}) \\ \vdots \\ <h'_2(t_{i_m}) \end{bmatrix} \tag{18}$$

$b$ is the unknown (assumed constant) platform drift rate vector.

Recovery of the platform drift rate vector can be obtained by processing the individual differences defined above in a recursive manner using the Kalman filter algorithm. No order of processing is preferred but for convenience assume the 2m-dimensional sequence: $[\delta\Delta\hat{\xi}(t_{i_1}), \ldots, \delta\Delta\hat{\eta}(t_{i_m})]$.

This sequence of individual observations can then be re-denoted as:

$$, \theta_j \quad j = 1, \ldots, 2m \tag{19}$$

with corresponding observation rows:

$$h_j \quad j = 1, \ldots, 2m \tag{20}$$

where for example:

$$\theta_1 = \delta\Delta\hat{\xi}(t_{i_1})_R \tag{21}$$

$$\theta_{2m} = \delta\Delta\hat{\eta}(t_{i_m})_R \tag{22}$$

$$h_1 = <h_1(t_{i_1}) \tag{23}$$

$$h_{2m} = <h_2(t_{i_m}) \tag{24}$$

Note that it may occur that only one of the deflection change differences is formable at one of the time points. Review of the processing scheme defined here indicates that this event poses no special problems.

Estimation of the Platform Drift Rate Vector Via a Kalman Mechanization

The functions to be implemented in estimating the platform drift rate vector from the observation sequence defined above are:
Initialization (One Time Event)
Kalman Gain Computation (Iterative)
Drift Rate Estimate Update (Iterative)
Covariance Matrix Decrement (Iterative)
These functions are defined below.

Initialization

Set:

$$\Sigma = \Sigma_o = \begin{bmatrix} \sigma^2_{b_E} & 0 & 0 \\ 0 & \sigma^2_{b_N} & 0 \\ 0 & 0 & \sigma^2_{b_z} \end{bmatrix} \tag{25}$$

where:

$$\begin{bmatrix} \sigma^2_{b_E} \\ \sigma^2_{b_N} \\ \sigma^2_{b_z} \end{bmatrix} = \begin{bmatrix} (0.001°/hr)^2 \\ (0.001°/hr)^2 \\ (0.002°/hr)^2 \end{bmatrix} \tag{26}$$

are the initial variances for the platform drift rate components.
Set:

$$\hat{b} = \begin{bmatrix} \hat{b}_E \\ \hat{b}_N \\ \hat{b}_z \end{bmatrix} = 0 \tag{27}$$

where the 3 sets of equations defined immediately above are solved iteratively for $j = 1, \ldots, 2m$.

Estimation of the Error in the Real-Time Estimates of the Deflection Changes Due to Drift Rates and Formation of the Smoothed Estimates Once all 2m available deflection change differences defined above have been processed to yield the platform drift rate estimate $\hat{b}$, (wherein $\hat{b} = \hat{b}_{2m}$) the errors in each of the 2n real-time deflection change estimates is computed as:

$$\delta\Delta \hat{\xi}_s = \begin{bmatrix} \delta\Delta \hat{\xi}(t_1) \\ \vdots \\ \delta\Delta \hat{\xi}(t_n) \end{bmatrix}_s = H_1 \hat{b} \tag{36}$$

$$\delta\Delta \hat{\eta}_s = \begin{bmatrix} \delta\Delta \hat{\eta}(t_1) \\ \vdots \\ \delta\Delta \hat{\eta}(t_n) \end{bmatrix}_s = H_2 \hat{b} \tag{37}$$

where:

$$H_1 = \begin{bmatrix} <h_1(t_1) \\ \vdots \\ <h_1(t_n) \end{bmatrix} \tag{38}$$

$$H_2 = \begin{bmatrix} <h_2(t_1) \\ \vdots \\ <h_2(t_n) \end{bmatrix} \tag{39}$$

[1] $\hat{b} = \hat{b}_{2m}$

The smoothed estimates of the 2n deflection change components are then formed as:

$$\Delta \hat{\xi}_s = \begin{bmatrix} \Delta \hat{\xi}(t_1) \\ \vdots \\ \Delta \hat{\xi}(t_n) \end{bmatrix}_s = [\Delta \hat{\xi}_R - \delta\Delta \hat{\xi}_s] \tag{40}$$

$$\Delta \hat{\eta}_s = \begin{bmatrix} \Delta \hat{\eta}(t_1) \\ \vdots \\ \Delta \hat{\eta}(t_n) \end{bmatrix}_s = [\Delta \hat{\eta}_R - \delta\Delta \hat{\eta}_s] \tag{41}$$

It is again noted that the foregoing analysis assumes that there have been "$n$" stops, and that at each stop there have been a determination both of the north-south deflection of the vertical and also of the east-west deflection of the vertical, making a total of $2n$ deflection of the vertical preliminary determinations which are respectively corrected by the $2n$ deflection change components determined in the manner set forth above.

Together with the information set forth in the articles cited above, the foregoing mathematical presentation will permit those skilled in the art to implement the method described in the present specification utilizing any suitably mechanized inertial surveying system having capabilities comparable to the AUTOSURVEYOR system mentioned hereinabove. Further, suitable programs for use with the AUTOSURVEYOR system may be purchased from the Guidance and Control Division, Litton Systems, Inc., 5500 Canoga Avenue, Woodland Hills, California 91364.

In conclusion, it is to be understood that the foregoing description is of an illustrative method of implementing the present invention, and that other implementations, including the use of different types of vehicles, or of different mathematical approaches for performing equivalent operations, are within the scope of the present invention. More specifically, the deflection of the vertical of a series of survey points of accurately known position could also be accomplished by the present method, and the position determining steps could then be eliminated.

I claim:

1. A geodetic survey method using an inertial surveying system mounted in a vehicle which may be periodically stopped or brought to a substantially fixed position relative to the earth, comprising the steps of:
   calibrating the system while the vehicle is in a fixed position including biasing the inertial system platform gyros and aligning the system accelerometers with the local coordinates;
   at a first control point having a known location and a known deflection of the vertical, recording the surveying system indicated position, and recording the output from the inertial system sensing units, as required for determining the deflection of the vertical;
   moving the vehicle along the terrain to be surveyed;
   stopping the vehicle, at points which are to be surveyed, and at time intervals not to exceed the survey limit time interval, and eliminating accumulated errors from said system;
   at all stops recording position including latitude, longitude, elevation, and the output from inertial system sensing units as required for determining the deflection of vertical, without releveling the inertial platform;
   proceeding to a control point having a known location and known deflection of the vertical to take a second control point indication reading, and recording the inertial surveying system indicated position with regard to latitude, longitude elevation, and recording the output from the inertial system sensing units as required for determining the deflection of the vertical;
   determining the position errors in latitude, longitude and elevation between the first and second control point indication readings;
   recalculating the position of the intermediate survey points, utilizing the position errors between the two control point readings;
   determining the error in the deflection of the vertical between the first and second control point indication readings; and
   calculating the deflection of the vertical at the intermediate survey points, utilizing the error in the change in the deflection of the vertical between the two control point readings.

2. A geodetic survey method as defined in claim 1 further including the step of leveling said inertial system to the local gravitational vertical at the first control point.

3. A geodetic survey method as defined in claim 1 further including the step of plotting the results of the survey on a map.

4. A geodetic survey method as defined in claim 1 including the additional step of recording the time of each stop, and wherein the recalculation of the location of the intermediate survey point locations, and the calculation of the deflection of the vertical of the intermediate survey points, utilize the times of surveying the intermediate points as inputs.

5. A geodetic survey method using an inertial surveying system mounted in a vehicle which may be periodically stopped or brought to a substantially fixed position relative to the earth, comprising the steps of:
   initially calibrating and aligning the inertial surveying system while the vehicle is in a fixed position;
   at a first control point having a known location and a known deflection of the vertical, recording the outputs from the inertial system including outputs required for determining the deflection of the vertical;
   moving the vehicle along the terrain to be surveyed;
   stopping the vehicle, at points which are to be surveyed, and at time intervals not to exceed the survey limit time interval, and eliminating accumulated errors from said system;
   at all stops recording the outputs from the inertial system required for determining the deflection of vertical, without releveling the inertial platform;
   proceeding to a control point having a known location and a known deflection of the vertical to take a second control point indication reading, and recording the outputs from the inertial system required for determining the deflection of the vertical;
   determining the error in the deflection of the vertical between the first and second control point indication readings; and
   calculating the deflection of the vertical at the intermediate survey points, utilizing the error in the deflection of the vertical between the two control point readings.

6. A geodetic survey method as defined in claim 5 further comprising the steps of:
   determining the position errors between the first and second control point indication readings; and
   calculating the position of the intermediate survey points, utilizing the position errors between the two control point readings.

7. A geodetic survey method as defined in claim 5 further including the steps of:
   recording the time of each of the stops; and
   calculating the deflection of the vertical at the survey points as a function of the time of stopping at each of said stops.

* * * * *